United States Patent [19]
Murphy

[11] Patent Number: 5,130,981
[45] Date of Patent: Jul. 14, 1992

[54] THREE PORT RANDOM ACCESS MEMORY IN A NETWORK BRIDGE

[75] Inventor: Jeffrey R. Murphy, Rocklin, Calif.

[73] Assignee: Hewlett-Packard Company, Palo Alto, Calif.

[21] Appl. No.: 627,280

[22] Filed: Dec. 14, 1990

Related U.S. Application Data

[63] Continuation of Ser. No. 327,279, Mar. 22, 1989, abandoned.

[51] Int. Cl.$^5$ ............................................... H04S 3/26
[52] U.S. Cl. ................................ 370/85.6; 370/85.13; 370/94.1
[58] Field of Search ................. 370/85.13, 85.14, 94.1, 370/85.6; 364/200, 900

[56] References Cited

U.S. PATENT DOCUMENTS

| | | |
|---|---|---|
| Re. 31,852 | 3/1985 | Soderblom . |
| 4,093,827 | 6/1978 | Charransol et al. .................. 370/66 |
| 4,390,987 | 6/1983 | Best ..................................... 370/112 |
| 4,597,078 | 6/1986 | Kempf ............................... 370/85.13 |
| 4,858,112 | 8/1989 | Puerzer et al. ....................... 370/16 |

OTHER PUBLICATIONS

"Draft Addendum to ANSI/IEEE Std 802.5-1988 Token Ring MAC & PHY Specification Enhancement for Multiple-Ring Networks", prepared by the IEEE 802.5 Rapporteur on Multiple-Ring Networks IEEE, Inc., Dec. 9, 1988, pp. 1-25.

*Primary Examiner*—Douglas W. Olms
*Assistant Examiner*—Melvin Marcelo

[57] ABSTRACT

A network bridge with a three port interface to random access memory is presented. The network bridge includes a system processor, a random access memory, a first memory access controller, a second memory access controller and a three port interface to the random access memory. The random access memory is used to store data packets received by the network bridge from the first network and the second network. The three port interface to the random access memory includes a first port connected to the first memory access controller, a second port connected to the second memory access controller and a third port connected to the system processor. The three port interface allots to the first memory access controller, to the second memory access controller and to the system processor access to the random access memory. The access to the random access memory is allotted so that the first memory access controller, the second memory access controller and the system processor all have equal access priority. The three port interface access cycle is approximately three time as fast as the access cycle of the system processor, the first memory access controller and the second memory access controller. This eliminates the need for local buffers between the memory access controllers and the networks and allows the system processor and the memory access controllers to access the three port interface simultaneously with a minimum of access collisions.

6 Claims, 3 Drawing Sheets

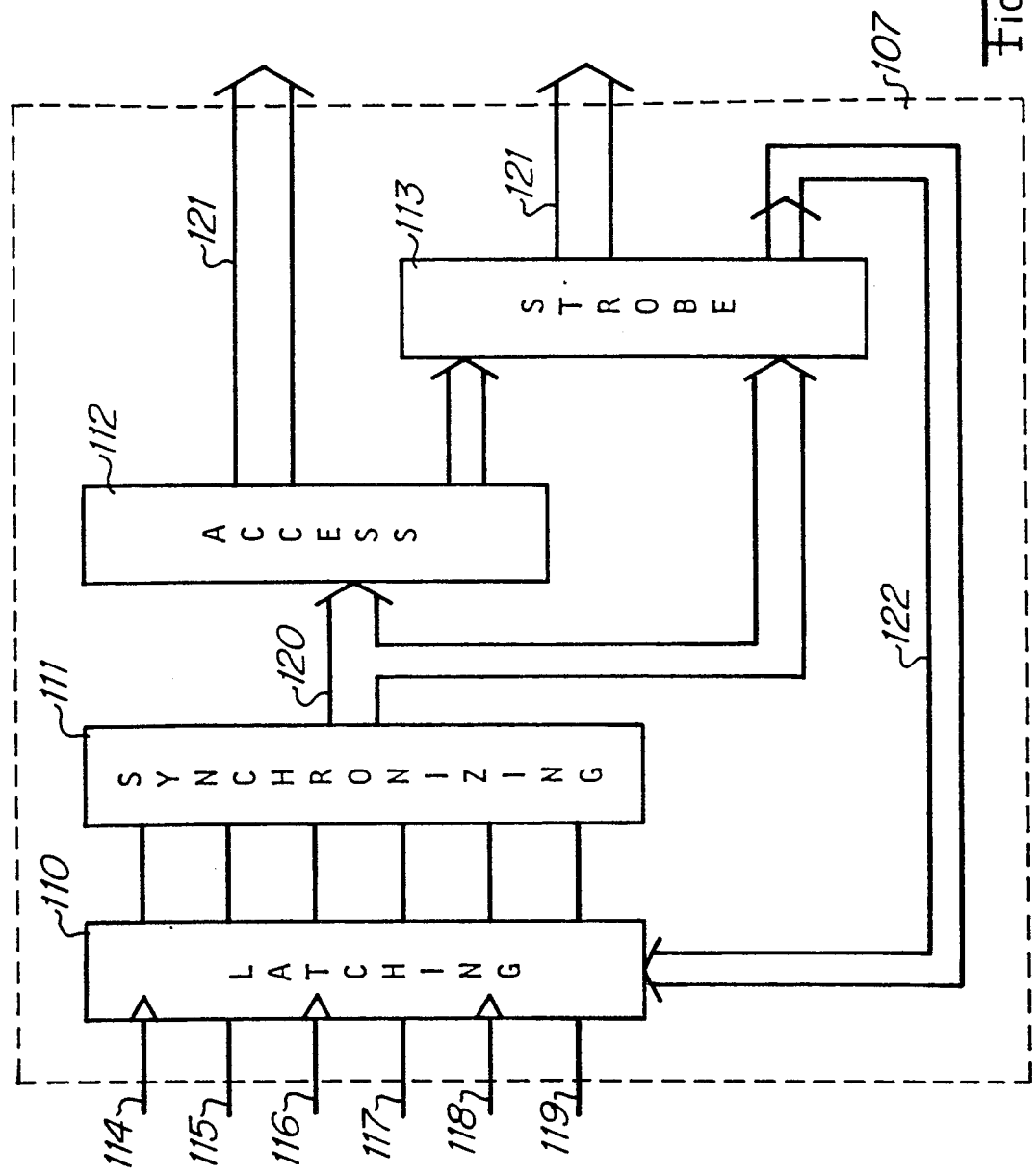

THREE PORT RANDOM ACCESS MEMORY IN A NETWORK BRIDGE

CROSS REFERENCE TO RELATED APPLICATION

This is a continuation of copending application Ser. No. 07/327,279 filed on Mar. 23, 1989, now abandoned.

BACKGROUND

The present invention concerns the transfer of data from a first network through a bridge to a second network.

A network bridge connects two networks and facilitates the transfer of data between the networks. Typically when a personal computer acts as a network bridge, interface boards for each network are inserted into a backplane of the personal computer. On the board for each network is a direct memory access (DMA) controller consisting of a front-end processor and memory. The DMA controllers use an input/output (I/O) bus to access a main memory also connected to the I/O bus. A system processor within the personal computer also accesses the main memory through the I/O bus in order to control data transfer between the networks.

One problem with the above-described prior art system is the delay in the transfer of data between the networks introduced by the use of a standard I/O bus. This delay is caused by a number of factors. For example, I/O busses are typically designed such that the system processor uses the I/O bus a large percentage of time, lessening the time other entities such as DMA controllers are able to use the bus. The bus cycle usually matches the timing of an I/O cycle of the system processor or DMA controller. Also, a personal computer typically has as many as ten backplane slots. The necessary handshaking protocol and power requirements to drive lines for ten backplane slots additionally reduces the speed of operation of the I/O bus. In addition, delay is typically introduced by the use of local buffers between DMA controllers and the networks.

SUMMARY OF THE INVENTION

In accordance with the preferred embodiment of the present invention a network bridge with a three port interface to random access memory is presented. The network bridge includes a system processor, a random access memory, a first memory access controller, a second memory access controller and a three port interface to the random access memory. The random access memory is used to store data packets received by the network bridge from the first network and the second network. The three port interface to the random access memory includes a first port connected to the first memory access controller, a second port connected to the second memory access controller and a third port connected to the system processor. The three port interface allots to the first memory access controller, to the second memory access controller and to the system processor access to the random access memory. The access to the random access memory is allotted so that the first memory access controller, the second memory access controller and the system processor all have equal access priority.

The three port interface access cycle is approximately three time as fast as the access cycle of the system processor, the first memory access controller and the second memory access controller. This eliminates the need for local buffers between the memory access controllers and the networks. Further, the access cycle speed of the three port interface allows the system processor and the memory access controllers to access the three port interface simultaneously with a minimum of access collisions.

BRIEF DESCRIPTION OF THE DRAWINGS

FIG. 3 shows a block diagram of a random access memory (RAM) interface shown in FIG. 2 in accordance with the preferred embodiment of the present invention.

DESCRIPTION OF THE PREFERRED EMBODIMENTS

Figure 1:
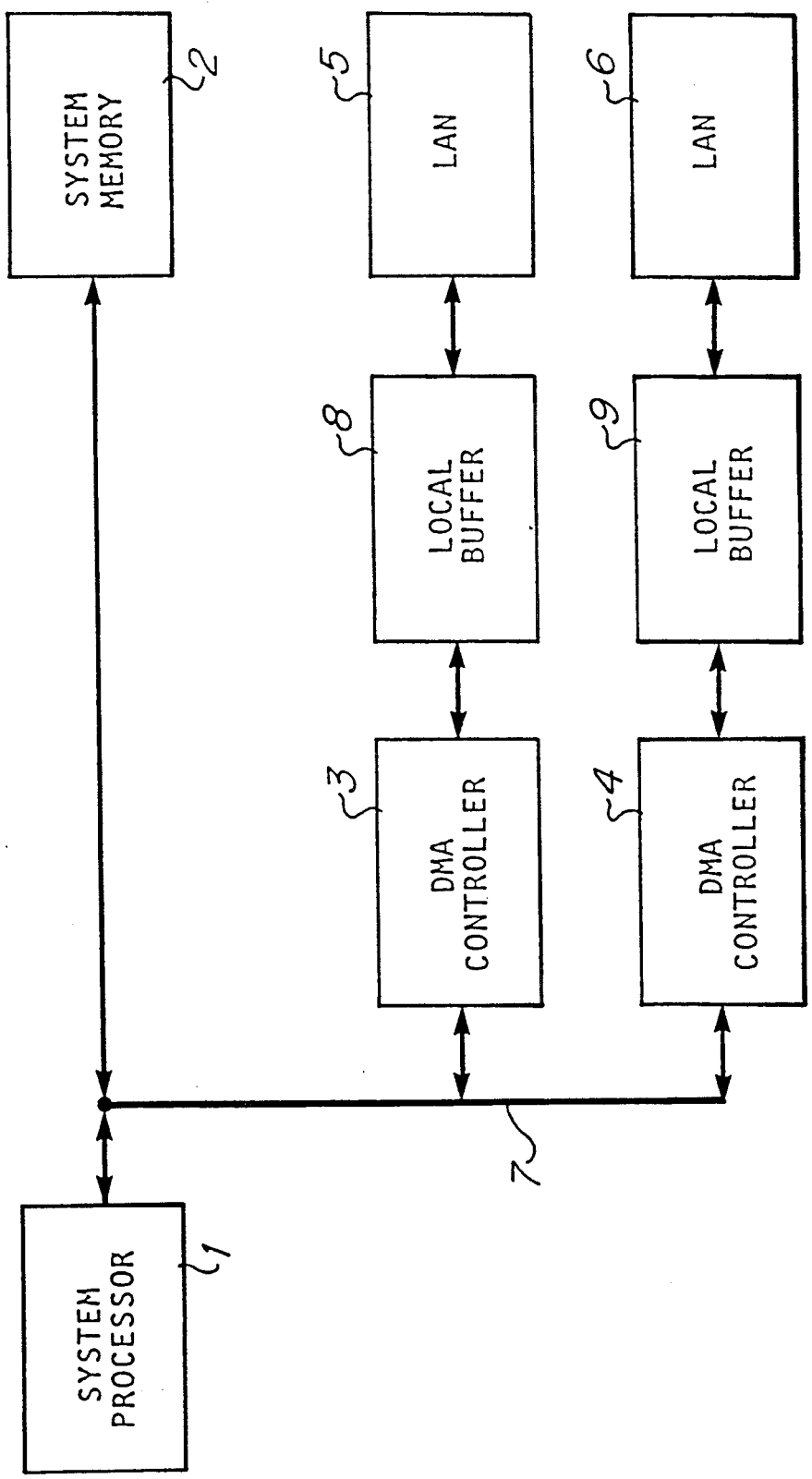
FIG. 1 shows a block diagram of a prior art network bridge.

In FIG. 1 a prior art configuration for a network bridge is shown. A system processor 1, a system memory 2, a direct memory access (DMA) controller 3 and a DMA controller 4 are shown connected to an input/output (I/O) bus 7. A local area network (LAN) 5 can access I/O bus 7 through DMA controller 3. Similarly, LAN 6 can access I/O bus 7 through DMA controller 5.

Typically system processor 1 will use I/O bus 7 a large percentage of time. One reason for such high use by system processor 1 is that system memory 2, accessed by system processor 1 through I/O bus 7, contains instruction code executed by system memory 2. The use of I/O bus 7 by system memory 2 lessens the time DMA controller 3 and DMA controller 5 are able to use the bus. Because DMA controller 3 has limited access to I/O bus 7, it is necessary for DMA controller 3 to buffer data to and from LAN 5 in a local buffer 8. Similarly, because DMA controller 5 has limited access to I/O bus 7 it is necessary for DMA controller 5 to buffer data to and from LAN 6 in a local buffer 9. Further, I/O bus 7 may support as many as ten backplane slots. The necessary handshaking protocol and power requirements to drive lines for ten backplane slots additionally reduces the speed of operation of I/O bus 7.

Figure 2:
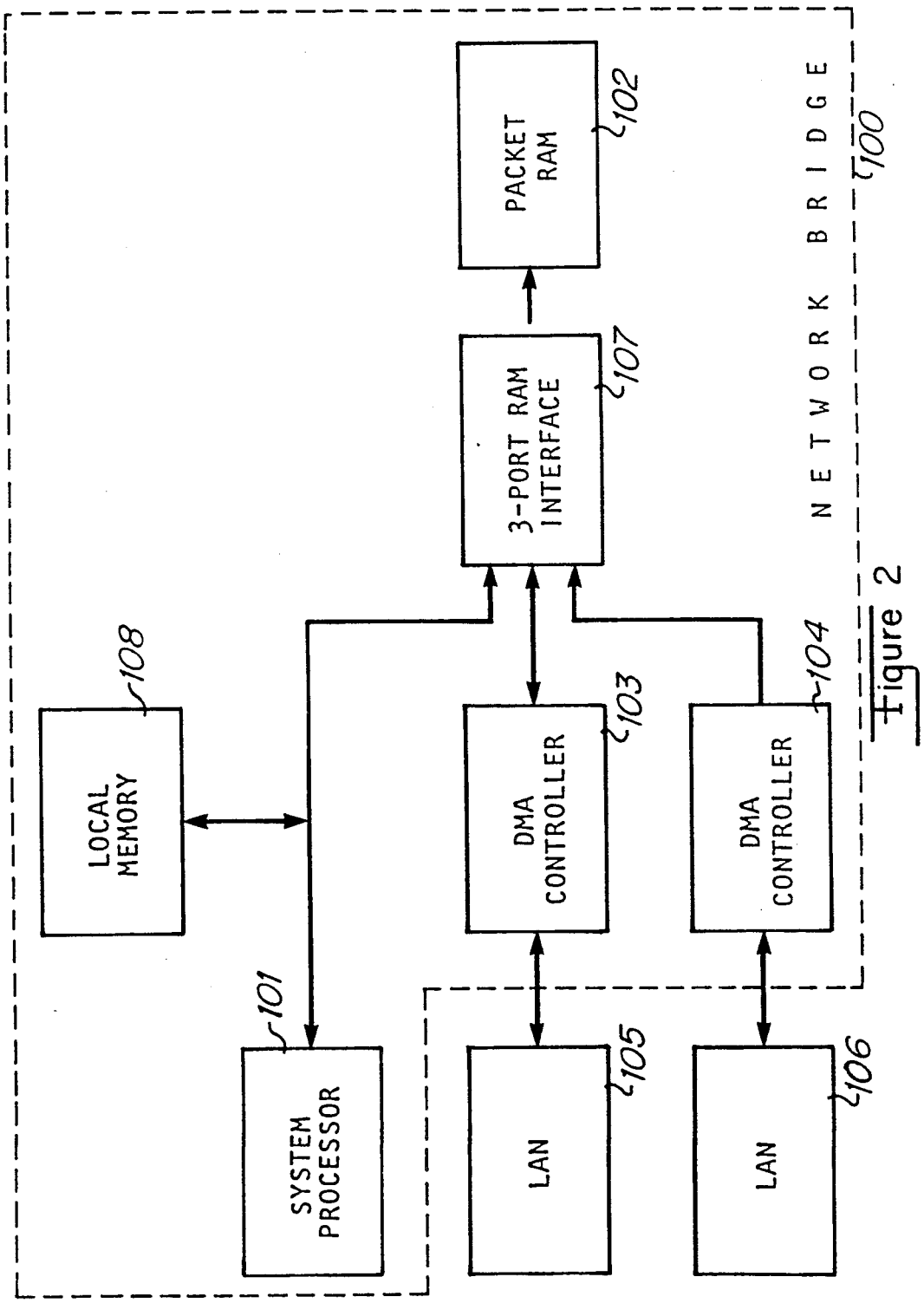
FIG. 2 shows a block diagram of a network bridge in accordance with the preferred embodiment of the present invention.

FIG. 2 shows a block diagram of a network bridge 100 in accordance with the preferred embodiment of the present invention. Network bridge 100 includes a system processor 101, a local memory 108, a DMA controller 103, a DMA controller 104, a three port random access memory (RAM) interface 107 and packet RAM 102. Local memory 108 is used by system processor 101 as local storage to store operating instructions and all data except for network packet data. Packet RAM 107 is a memory dedicated to receiving and storing data packets from a local area network (LAN) 105 and a LAN 106. Three port RAM interface 107 controls access to packet RAM 107. System processor 101, DMA controller 103 and DMA controller 104 are all granted access to packet RAM 102 by three port RAM interface 107 at an equal priority level.

When an arriving packet from LAN 105 or LAN 106 has been completely received into packet RAM 102, the source and destination addresses contained in the arriving packet can be examined by system processor 101 and a determination made as to whether the packet needs to be transmitted on the other LAN. If so, the packet is placed in a transmit queue for the LAN. Otherwise the packet is discarded by reclaiming buffer space occupied by the packet in packet RAM 102. If the packet is directed to the bridge, the system processor 101 handles the message appropriately.

FIG. 3 shows a block diagram of three port RAM interface 107. A latching circuit 110 latches data from an input 114, an input 115, an input 116, an input 117, an input 118 and an input 119. Input 114 is a request line by which LAN 105, through DMA controller 103, requests access to packet RAM 102. Input 115 is an access type line by which LAN 105, through DMA controller 103, specifies whether it wants to write to or read from packet RAM 102. Input 116 is a request line by which LAN 106, through DMA controller 104, requests access to packet RAM 102. Input 117 is an access type line by which LAN 106, through DMA controller 104, specifies whether it wants to write to or read from packet RAM 102. Input 118 is a request line by which system processor 101 requests access to packet RAM 102. Input 119 is an access type line by which system processor 101 specifies whether it wants to write to or read from packet RAM 102. Latching circuit 110 uses TTL logic to double latch each of input lines 114–119 reducing the probability of meta-stable conditions and allowing DMA controller 103, DMA controller 104 and system processor 101 to make asynchronous requests.

Once signals are latched in latching circuit 110, the signals are synchronized by synchronizing circuit 111. Synchronization circuit 111 may be, for example, two 74AS82 synchronizers clocked with the positive edge of a 30 megahertz clock.

The synchronized signals are then forwarded to an access state machine 112 and a strobe state machine 113. Access state machine 112 may be implemented, for example, with the use of a PAL22VP10 20 nanosecond integrated circuit. Strobe state machine 113 may also be implemented with the use of a PAL22VP10 20 nanosecond integrated circuit.

Access state machine 112 and strobe state machine 113 generate control signals 121 for packet RAM 102. Control signals 121 include read and write strobes for packet RAM 102, and strobes for gating addresses to packet RAM 102 and for gating data into or out of packet RAM 102. Control signals 121 also include a signal NVA which when asserted indicates DMA controller 103 was the last port to be serviced, a signal NVB which when asserted indicates DMA controller 104 was the last port to be serviced and a signal NVC which indicates that system processor 101 was the last port to be serviced.

Three port interface RAM interface 107 operates with an access cycle that is approximately three time as fast as the access cycle of system processor 101, DMA controller 103 and DMA controller 104. This eliminates the need for local buffers between the DMA controllers and the LANs. Further, the access cycle speed of three port interface RAM 107 allows system processor 101, DMA controller 103 and DMA controller 104 to access the three port interface simultaneously with a minimum of access collisions.

Since DMA controller 103, DMA controller 104 and system processor 101 all need to access packet RAM 102 with an equally high priority, in the preferred embodiment of the invention three port RAM interface 107 grants DMA controller 103, DMA controller 104 and system processor 101 equal access priority. The access priority is based on the values of NVA, NVB and NVC indicating which port had last access, and on which of DMA controller 103, DMA controller 104 and System processor 101 currently requests access to packet RAM 102. Table 1 below summarizes a preferred access priority scheme. In Table 1 DMA controller 103 is considered to be at port A, DMA controller 104 is considered to be at port B and system processor 101 is considered to be at port C.

TABLE 1

| Last Port To Have Access | Ports Requesting Access | | | Next Access Goes to Port |
|---|---|---|---|---|
| | A | B | C | |
| Any | Yes | No | No | A |
| Any | No | Yes | No | B |
| Any | No | No | Yes | C |
| A | Yes | Yes | No | B |
| B | Yes | Yes | No | A |
| C | Yes | Yes | No | A |
| A | No | Yes | Yes | B |
| B | No | Yes | Yes | C |
| C | No | Yes | Yes | B |
| A | Yes | No | Yes | C |
| B | Yes | No | Yes | C |
| C | Yes | No | Yes | A |
| A | Yes | Yes | Yes | B |
| B | Yes | Yes | Yes | C |
| C | Yes | Yes | Yes | A |

In the preferred embodiment memory cycles can be gated as often as every 200 nano seconds and start on 33 nano second boundaries. During the 200 nano second period, the accessing port address bus is gated to packet RAM 102 and the data value is latched when reading or writing. This allows system processor 101, DMA controller 103 and DMA controller 104 to complete their access cycles independently of the access cycle of packet RAM 102.

I claim:

1. A network bridge which allows transfer of data packets between a first network and a second network, the network bridge comprising:

a system processor;

a random access memory used to store data packets received by the network bridge from the first network and the second network;

first memory access means, coupled to the first network, for providing access by the first network to the random access memory;

second memory access means, coupled to the second network, for providing access by the second network to the random access memory; and, a three port interface to the random access memory, coupled to the random access memory, the three port interface having a first port coupled to the first memory access means, a second port coupled to the second memory access means and a third port coupled to the system processor, wherein the three port interface provides equal access priority to the first memory access means, the second memory access means and the system processor and wherein data which is read from the written to the random access memory by the first memory access means, by the second memory access memory and by the system processor is latched at each port of the three port interface.

2. A network bridge as in claim 1 wherein the three port interface includes:

a latching circuit coupled to the first port, the second port and the third port;

a synchronizing circuit coupled to the latching circuit which synchronizes signals from the latching circuit; and state machine means, coupled to the synchronizing circuit, for generating control signals to be applied to the random access memory.

3. A network bridge as in claim 1 wherein an access cycle of the three port interface is approximately three times as fast as an access cycle of the system processor, an access cycle of the first memory access means and an access cycle of the second memory access means.

4. In a network bridge which allows transfer of data packets between a first network and a second network, a method for allowing access by a first memory access controller for the first network, a second memory access controller for the second network and a system processor to a random access memory which stores data packets received by the network bridge from the first network and the second network, the method comprising the steps of:

(a) receiving memory access requests by a three port memory interface from the first memory access controller, the second memory access controller and the system processor respectively when the first memory access controller, the second memory access controller and the system processor request access to the random access memory;

(b) allotting by the three port memory interface to the first memory access controller, to the second memory access controller and to the system processor access to the random access memory, the access to the random access memory being allotted so that the first memory access controller, the second memory access controller and the system processor all have equal access priority;

(c) latching, at each port of the three port memory interface, data which is read from and written to the random access memory by the first memory access controller, by the second memory access controller and by the system processor.

5. A method as in claim 4 wherein when in step (a) the three port memory interface simultaneously receives memory access requests from more than one of the first memory access controller, the second memory access controller and the system processor, in step (b) the three port memory interface grants access based on which of the first memory access controller, the second memory access controller and the system processor last accessed the random access memory.

6. A method as in claim 4 wherein an access cycle of the three port interface is approximately three times as fast as an access cycle of the system processor, an access cycle of the first memory access controller and an access cycle of the second memory access controller.

* * * * *